(12) United States Patent
Hill et al.

(10) Patent No.: US 9,896,607 B2
(45) Date of Patent: Feb. 20, 2018

(54) AMINE CO-ACCELERATOR FOR ACRYLIC ADHESIVES

(71) Applicant: LORD Corporation, Cary, NC (US)

(72) Inventors: John E. Hill, Apex, NC (US); Kirk J. Abbey, Garner, NC (US)

(73) Assignee: LORD Corporation, Cary, NC (US)

( * ) Notice: Subject to any disclaimer, the term of this patent is extended or adjusted under 35 U.S.C. 154(b) by 248 days.

(21) Appl. No.: 14/661,324

(22) Filed: Mar. 18, 2015

(65) Prior Publication Data

US 2015/0267092 A1 Sep. 24, 2015

Related U.S. Application Data

(60) Provisional application No. 61/955,251, filed on Mar. 19, 2014.

(51) Int. Cl.
| | | |
|---|---|---|
| C09J 4/06 | (2006.01) |
| B32B 15/20 | (2006.01) |
| C08K 5/18 | (2006.01) |
| C09J 133/12 | (2006.01) |
| B32B 15/082 | (2006.01) |
| C08F 220/10 | (2006.01) |
| C09J 133/06 | (2006.01) |
| C09J 143/02 | (2006.01) |
| C08K 5/3462 | (2006.01) |

(52) U.S. Cl.
CPC ............ *C09J 133/12* (2013.01); *B32B 15/082* (2013.01); *B32B 15/20* (2013.01); *C08F 220/10* (2013.01); *C09J 4/06* (2013.01); *C09J 133/066* (2013.01); *C09J 143/02* (2013.01); *B32B 2250/03* (2013.01); *C08K 5/18* (2013.01); *C08K 5/3462* (2013.01); *C08L 2312/00* (2013.01); *Y10T 428/31699* (2015.04); *Y10T 428/31935* (2015.04)

(58) Field of Classification Search
None
See application file for complete search history.

(56) References Cited

U.S. PATENT DOCUMENTS

| | | | |
|---|---|---|---|
| 4,223,115 A | 9/1980 | Zalucha et al. | |
| 4,524,104 A * | 6/1985 | Hagio | B32B 27/10 156/230 |
| 6,225,408 B1 | 5/2001 | Huang et al. | |
| 2009/0270527 A1* | 10/2009 | Lin | A61K 6/08 523/116 |
| 2013/0310466 A1 | 11/2013 | Vogt | |

FOREIGN PATENT DOCUMENTS

JP 58191706 11/1983

* cited by examiner

*Primary Examiner* — Sheeba Ahmed

(57) ABSTRACT

An acrylic adhesive composition is provided comprising a free-radical polymerizable monomer, an initiation system and a co-accelerator that enhances the reactivity of the initiation system by increasing the reaction rate between the oxidizing agent and the reducing agent. The free radical-polymerizable monomer preferably comprises methyl methacrylate (MMA), the initiator system preferably comprises N,N-diisopropanol-p-toluidine (DIIPT) and benzoyl peroxide (BPO), and the co-accelerator preferably comprises 1,4-diazabicyclo[2.2.2]octane (or triethylene diamine (TDA)).

15 Claims, 4 Drawing Sheets

AMINE CO-ACCELERATOR FOR ACRYLIC ADHESIVES

CROSS REFERENCE TO RELATED APPLICATIONS

The present application claims priority under 35 U.S. C. § 119(e) from U.S. Provisional Patent Application Ser. No. 61/955,251 entitled "AMINE CO-ACCELERATOR FOR ACRYLIC ADHESIVES", filed Mar. 19, 2014, the disclosure of which is herein incorporated by reference.

FIELD OF THE INVENTION

The present invention relates to co-accelerators for free radical cured acrylic adhesives that enhance the activity of the reducing agent. These co-accelerators deliver fast cure speed of the adhesive with surprisingly long open time, render the adhesive cure rate insensitive to acidic adhesion promoters, and allow the acrylic adhesive to bond strongly to a variety of metals, including aluminum.

BACKGROUND OF THE INVENTION

Acrylic structural adhesive compositions are well-known articles of commerce which are extensively used commercially for bonding metal and plastic materials. The load-bearing and stress-relieving properties of structural adhesives, as well as their bond strength, which can exceed the strength of the materials which are being bonded, make these adhesives attractive alternatives to or partial replacements for mechanical methods, such as riveting or spot welding, of joining materials, especially where it is preferable to distribute load stresses over larger areas rather than to concentrate such stresses at a few points. Their use can reduce or eliminate costly finishing operations necessitated by mechanical joining methods, present a more pleasing exterior and at least reduce the possibility of corrosion of assemblies containing one or more metal components. Additionally, they can be used to bond a diversity of metals without extensive surface preparation.

Acrylic structural adhesives are extensively used for providing structural strength-imparting bonds to joined metal and or polymer materials. Acrylic structural adhesives are useful for bonding of metal parts in place of welding or mechanical fastening techniques. The structural requirements include high bond strength and good failure mode. A typical method to measure bond strength is the lap shear, high speed impact, and T-peel tests. One prevalent use for acrylic structural adhesives is in forming hem flanges in automotive body panels and doors Conventional acrylic structural adhesives typically comprise a mixture of one or more olefinic reactive monomers such as methylmethacrylate and methacrylic acid, toughener(s) and redox initiator system. The toughener(s) may or may not be reactive or polymerizable with the reactive monomers. Reactive polymers such as unsaturated polyesters and acrylourethane prepolymers may be used to graft onto or crosslink the initiated monomers during polymerization. In addition, fully formulated acrylic structural adhesives typically contain other additives for improving adhesion to substrate materials, environmental resistance, impact strength, flexibility, heat resistance, and the like. Epoxy resins impart improved heat resistance.

SUMMARY OF THE INVENTION

In an embodiment of the present invention, a curable composition is provided comprising a free-radical polymerizable acrylic monomer, an oxidizing agent, an aromatic tertiary amine reducing agent, and a tertiary amine co-accelerator comprising a bicyclic diaza compound that increases the reaction rate between the oxidizing agent and the reducing agent. In a preferred embodiment of the present invention, the reducing agent comprises at least one of N,N-diisopropanol-p-chloroaniline; N,N-diisopropanol-p-bromoaniline; N,N-diisopropanol-p-bromo-m-methylaniline; N,N-dimethyl-p-chloroaniline; N, N-dimethyl-p-bromoaniline; N,N-diethyl-p-chloroaniline; N,N-diethyl-p-bromoaniline; N,N-dimethyl-p-aniline; or N,N-diisopropanol-p-toluidine, and most preferably N,N-diisopropanol-para-toluidine.

In another embodiment of the present invention, the co-accelerator comprises 1,4-diazabicyclo[2.2.2]octane. In a further preferred embodiment of the present invention, the tertiary amine reducing agent comprises N—N-diisopropanol-para-toluidine and the co-accelerator comprises 1,4-diazabicyclo[2.2.2]octane and the composition is otherwise free of amine compounds.

In one embodiment of the present invention, the composition is free of isocyanate compounds. In a further embodiment of the present invention, the free radical-polymerizeable monomer comprises at least one of methylmethacrylate, or tetrahydrofurfuryl methacrylate.

In another embodiment of the present invention, the composition further comprises a toughener, preferably at least one of glycidyl methacrylate/carboxyl terminated butadiene (GMA/CTB) adducts, core-shell impact modifiers, or block copolymer elastomers. In one embodiment of the present invention, the composition further comprises an adhesion promoter, preferably at least one of hydroxyethyl methacrylate phosphate or methacrylic acid. In another preferred embodiment of the present invention, the oxidizing agent comprises benzoyl peroxide.

In an additional embodiment of the present invention, the composition is provided in two parts: in part A: (a) the at least one free radical-polymerizable monomer; and (b) the reducing agent; and in part B: an oxidizing agent; wherein the co-accelerator is present in at least one of part A or part B; preferably the weight ratio of part A to part B is from about 1:1 to about 15:1.

In yet another embodiment of the present invention, the composition is disposed between two substrates and cured so as to provide a bond therebetween having a bond strength of at least 1000 psi as measured by lap shear strength. In one embodiment of the present invention, at least one of the two substrates comprises aluminum.

DETAILED DESCRIPTION OF THE INVENTION

Figure 1:
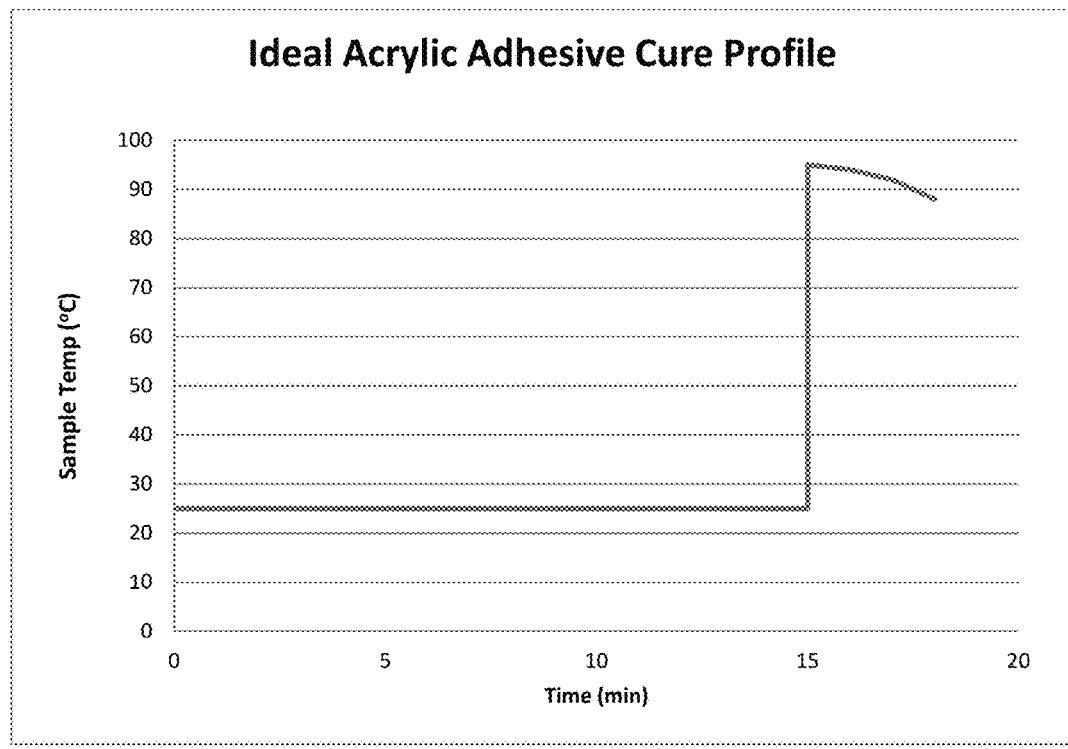
FIG. 1 represents the ideal acrylic adhesive cure profile evidencing reaction propagation of a "snap cure" temperature profile.

In a first aspect of the present invention, an acrylic adhesive composition is provided comprising a free-radical polymerizable monomer, an initiation system and a co-accelerator that enhances the reactivity of the initiation system by increasing the reaction rate between the oxidizing agent and the reducing agent. In a preferred embodiment of the present invention, the free radical-polymerizable monomer comprises methyl methacrylate (MMA), the initiator system comprises N,N-diisopropanol-p-toluidine (DIIPT) and benzoyl peroxide (BPO), and the co-accelerator 1,4-diazabicyclo[2.2.2]octane (or triethylene diamine (TDA)).

In one embodiment of the present invent, the acrylic adhesive comprises 10 to 90% by weight of at least one free radical-polymerizable monomer in a major amount (the primary monomer). Representative monomers include esters of (meth)acrylic acid such as methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexyl methacrylate, 2-ethylhexyl methacrylate, lauryl methacrylate, glycidyl methacrylate and tetrahydrofurfuryl methacrylate (THFMA). The preferred monomer(s) contributes rigidity in the cured polymer and is selected from methacrylic esters exhibiting a homopolymer Tg of at least 50° C., preferably 60° C., and some as much as 105° C.

In a further embodiment of the present invention, the primary monomer may be combined with an ethylenic unsaturated carboxylic monomer such as methacrylic acid, acrylic acid, substituted (meth)acrylic acids, or diacids such as itaconic acid, maleic acid and fumaric acid. Further optional co-monomers includable herein are acrylonitrile, methacrylonitrile, acrylamide and methacrylamide; vinyl acetate; vinylidene chloride; and butadienes such as 2,3-dichloro-1,3-butadiene and 2-chloro-1,3-butadiene. Other useful monomers include maleate esters; and fumarate esters. In one embodiment, a mixture of the monomers tetrahydrofurfuryl methacrylate, methacrylic acid and methyl methacrylate is useful. In further embodiments it is optionally preferable to include a reactive diluent with the primary monomer.

Co-monomers optionally includable with the primary monomer include OH-functional monoethylenic unsaturated monomers like 2-hydroxyethyl(meth)acrylate, 3-hydroxypropyl (meth)acrylate, 4-hydroxybutyl (meth)acrylate, 4-hydroxycyclohexyl(meth) acrylate, 1,6-hexanediol mono (meth) acrylate, neopentyl glycol mono(meth)acrylate, 1,6-hexanediol dimethacrylate, and 1,4-butanediol dimethacrylate. Preferably from 0.0 to 10 wt % (on wt. of A-side) of a multifunctional crosslinking comonomer is included, such as trimethylohpropane di(meth) acrylate, trimethylolethane di(meth) acrylate, pentaerythritol tri (meth) acrylate, dipentaerythritol penta(meth)acrylate, and epoxy-diacrylates, such as ethoxylated Bisphenol A dimethacrylate.

The present invention includes an ambient temperature initiation system. The ambient temperature initiation systems that may be employed in the preferred adhesive systems are well-known redox couple systems and need not be discussed herein in detail. Basically, such systems comprise at least one oxidizing agent and at least one reducing agent which are co-reactive at room temperature to generate free radicals effective to initiate addition polymerization reactions and cure the adhesive. Substantially any of the known oxidizing and reducing agents which are so co-reactive can be employed. Representative oxidizing agents include, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone hydroperoxide, organic salts of transition metals such as cobalt naphthenate, and compounds containing a labile chlorine such as sulfonyl chloride. In one preferred embodiment of the present invent, the oxidizing agent comprises an organic peroxide, most preferably benzoyl peroxide (BPO).

In another preferred embodiment of the present invention, the reducing agent comprises an aromatic tertiary amine. Representatives reducing agents include at least one of N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; N, N-diethyl-p-bromoaniline; N, N-dimethyl-p-aniline; N, N-dimethyl-p-toluidine; N,N-diethyl-p-toluidine; N,N-diisopropanol-p-toluidine (DIIPT), or other p-halogenated aniline derivatives.

In one embodiment of the present invention, the reducing agent is present in the range from about 0.05 to about 10 preferably about 0.1 to about 6.0 percent by weight of polymerizable adhesive composition and the oxidizing agent is present in an amount in the range from about 0.5 to about 50 percent by weight of reducing agent. In a most preferred embodiment of the present invention, the reducing agent comprises DIIPT and the oxidizing agent comprises benzoyl peroxide.

In a further embodiment of the present invention, the acrylic adhesive composition comprises a co-accelerator. The co-accelerator is distinct from the accelerator/reducing agent as it will not accelerate the decomposition of the oxidizing agent, and therefore will not facilitate cure of the composition alone. However, when employed with a reducing agent as mentioned above, the co-accelerator will enhance the reactivity of the system providing more of a "snap cure" than the reducing agent alone.

In a preferred embodiment of the present invention, the co-accelerator comprises a cyclic tertiary amine, and preferably a tertiary amine comprising a bicyclic diaza compound wherein the nitrogen atoms are present in the rings at the juncture of the rings. In a most preferred embodiment of the present invention, the co-accelerator comprises 1,4-diazabicyclo[2.2.2]octane (TDA). In an embodiment of the present invention, the co-accelerator is present in an amount from 0.10 to 3.0 weight percent based on the total weight of the composition.

Though not wishing to be bound by the theory, co-accelerators of the present invention are thought to participate in the reaction to enhance the action of the reducing agent, without directly facilitating the decomposition of the oxidizer. The mechanics are believed to be driven by the higher basicity of the cyclic tertiary amine, which complexes with acidic components of the composition to enhance the reactivity of the reducing agent and oxidizer. Further, the co-accelerators of the present invention will not react with the oxidizer and cure the composition by themselves, and must be employed with a primary reducing agent as described above.

In one preferred embodiment of the present invention, the composition is preferably free of isocyanate functionality, i.e. reactive NCO groups. At times, isocyanates and/or polyurethanes are added to acrylic structural adhesives, however in this embodiment of the present invention a composition essentially free of isocyanate functionality is preferred. In a most preferred embodiment of the present invention, the composition is completely free of isocyanate reactive components.

In an additional embodiment of the present invention the acrylic composition further comprises a toughener. Examples of suitable tougheners include various solid and liquid elastomeric polymeric materials, and in particular liquid olefinic-terminated elastomers as described in U.S. Pat. Nos. 4,223,115; 4,452,944; 4,769,419; 5,641,834 and 5,710,235; and olefinic urethane reaction products of an isocyanate-functional prepolymer and a hydroxy functional monomer, as described in U.S. Pat. Nos. 4,223,115; 4,452, 944; 4,467,071 and 4,769,419.

Preferred urethane modified olefinic-terminated liquid elastomers include those disclosed in U.S. Pat. No. 4,769, 419 comprising the reaction product of an olefinic monoepoxide compound with a polycarboxylic homopolymer of conjugated dienes, and most specifically, the glycidyl methacrylate/carboxyl terminated butadiene (GMA/CTB) adduct as described in U.S. Pat. No. 4,769,419, Example 1.

A-B-A triblock block copolymers are useful tougheners. In one example the A block is polystyrene, alpha-methyl styrene, t-butyl styrene, or other ring alkylated styrenes as well as mixtures of some or all of the above and the B block is an elastomeric segment having a Tg of 0° C. or less, such as that derived from a conjugated diene, like butadiene, isobutylene or other olefin, like ethylene-propylene monomer. Commercially available block copolymer tougheners include EUROPRENE® which are available from Enichem Elastomers Americas, Inc. In one preferred embodiment of the present invention, the toughener is based on a terblock polymer of styrene-[isoprene]-styrene, 25-[50]-25, parts by weight. Additional commercial block copolymers comprise the Kraton® family available from Kraton Polymers, Inc, such as the Kraton SBS and SIS family of copolymers. Other high molecular weight tougheners include, for example, block copolymers and random copolymers including but not limited to polyethylene, polypropylene, styrene-butadiene, polychloroprene, EPDM, chlorinated rubber, butyl rubber, styrene/butadiene/acrylonitrile rubber and chlorosulfonated polyethylene. In another preferred embodiment of the present invention, the toughener comprises a styrene-butadiene-styrene block copolymer.

Other tougheners include the liquid olefinic-terminated elastomers, wherein the elastomeric moiety is based on homopolymers of butadiene, copolymers of butadiene and at least one monomer copolymerizable therewith, for example, styrene, acrylonitrile, methacrylonitrile (e.g. poly(butadiene-(meth)acrylonitrile or poly(butadiene-(meth)acrylonitrile-styrene) and mixtures thereof; as well as modified elastomeric polymeric materials, such as butadiene homopolymers and copolymers modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate to give, for example, methacrylate-terminated polybutadiene homopolymers and/or copolymers.

Inclusive as tougheners are the olefinic-terminated polyalkadienes having carboxy ester linking groups and at least one nascent secondary hydroxyl group, such as disclosed in U.S. Pat. No. 5,587,433, incorporated therein by reference. The secondary OH group may be optionally caped using an isocyanate as is disclosed in commonly owned U.S. Pat. No. 5,641,834, incorporated herein by reference.

Specific examples of adducted hydroxy-terminated polybutadiene include the reaction of anhydride modified OH-terminal PBD with dibasic anhydride (phthalic anhydride), then with an epoxy, such as glycidyl substituents.

A further toughener system utilizes a combination of two polymers having differing molecular weights as is taught in U.S. Pat. No. 6,225,408. A specific example taught therein is combination of a major amount of a primary toughener with a weight average molecular weight (MW) less than about 18,000 together with a minor amount of an auxiliary toughener with a MW greater than about 18,000. A specific example is a 60:40 mixture of glycidyl methacrylate terminated CTBN rubber, and a terblock copolymer of styrene-[isoprene]-styrene.

In an additional embodiment of the present invention and adhesion promoter is added to the acrylic composition. Adhesion promoters useful herein are the known phosphorus-containing compounds with mono-esters of phosphinic, mono- and diesters of phosphonic and phosphoric acids having one unit of vinyl or allylic unsaturation present. Vinylic unsaturation is preferred. Representative of the phosphorus-containing adhesion promoters are, without limitation, phosphoric acid; 2-methacryloyloxyethyl phosphate; bis-(2-methacryloxyloxyethyl)phosphate; 2-acryloyloxyethyl phosphate; bis-(2-acryloyloxyethyl)phosphate; methyl-(2-methacryloyloxyethyl)phosphate; ethyl methacryloyloxyethyl phosphate; methyl acryloyloxyethyl phosphate; ethyl acryloyloxyethyl phosphate; propyl acryloyloxyethyl phosphate, isobutyl acryloyloxyethyl phosphate, ethylhexyl acryloyloxyethyl phosphate, halopropyl acryloyloxyethyl phosphate, haloisobutyl acryloyloxyethyl phosphate or haloethylhexyl acryloyloxyethyl phosphate; vinyl phosphonic acid; cyclohexene-3-phosphonic acid; (α-hydroxybutene-2 phosphonic acid; 1-hydroxy-1-phenylmethane-1,1-diphosphonic acid; 1-hydroxy-1-methyl-1-disphosphonic acid: 1-amino-1phenyl-1,1-diphosphonic acid; 3-amino-3-hydroxypropane-1,1-disphosphonic acid; aminotris(methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; 3-methacryloyloxyethyl)phosphinic acid and allyl methacryloyloxyethyl phosphinic acid. A preferred adhesion promoter: is 2-hydroxyethylmethacrylate phosphate (HEMA-phosphate).

In a further embodiment of the present invention, the adhesion promoter comprises acids with acrylate functionality, including acrylic acid, methacrylic acid, crotonic acid, isocrotonic acid, fumaric acid, maleic acid, cinnanic acid, 2-methylmaleic acid, itaconic acid, 2-methylitaconic acid, sorbic acid, and α-β-methylene glutaric acid.

Another preferred class of adhesion promoters comprises the metal dimethacrylates. One particularly preferred adhesion promoter comprises zinc dimethacrylate. These adhesion promoters serve a dual purpose, metallic interaction with metal surface and crosslinking to strengthen polymer network. In one embodiment of the present invention, the metal dimethacrylate is present from 0.05 to 4.0 weight percent. In a preferred embodiment of the present invention, the metal dimethacrylate is present from about 0.5 to about 2.0 weight percent.

Other optional additives which are typically considered in fully formulated adhesives include antioxidants, inhibitors, anti-sag additives, thixotropes, processing aids, waxes, UV stabilizers, arc suppressants, and drip suppressants. Examples of typical additives are fumed silica, alumina, hindered phenols, substituted hydroquinone, silane-treated talc, mica, feldspar, and wollastonite.

Although the adhesive of the present invention may take many forms, the most preferred adhesive systems are provided as multipack or two-part adhesive systems where one package or part contains the polymerizable or reactive components and the reducing agent and a second package or part contains the oxidizing agent. The two parts are mixed together at the time of use in order to initiate the reactive cure. The preferred means for dispensing the adhesive are two-chambered cartridges equipped with static mixers in the nozzle, and for larger scale application, meter mix dispensing equipment. After mixing the individual packages, one or both surfaces to be joined are coated with the mixed adhesive system and the surfaces are placed in contact with each other. Preferred mix ratios typically include from 1:1 to 15:1, and more preferably 4:1 to 10:1 of A:B.

The adhesive systems of the invention may be used to bond metal surfaces, such as steel, aluminum and copper, to a variety of substrates, including metal, plastics, and other polymers, reinforced plastics, fibers, glass, ceramics, wood and the like. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bond strength at room temperature, thus heat is not required either for applying the adhesive systems to the substrates or for developing handling strength and dimensional stability.

Although the adhesives of the present invention are preferred for bonding metal surfaces, the present adhesive compositions may be applied as an adhesive, primer or coating to any surface or substrate capable of receiving the adhesive. The metals which are preferred for bonding with the present adhesives include zinc, copper, cadmium, iron, tin, aluminum, silver, chromium, alloys of such metals, and metallic coatings or platings of such metals such as galvanized steel including hot dipped, electrogalvanized steel and galvanealed steel.

The adhesive may be brushed, rolled, sprayed, dotted, knifed, cartridge-applied, especially from a dual cartridge; or otherwise applied to one substrate, but preferably to both substrates to desired thickness preferably not to exceed 60 mils. The substrates may be clamped for firmness during cure in those installations where relative movement of the two substrates might be expected. For example, to adhere metal surfaces, an adherent quantity of the adhesive composition is applied to one surface, preferably to both surfaces, and the surfaces are confronted with the adhesive composition therebetween. The adhesive should have a thickness less than 60 mils for optimum results. The smoothness of the surfaces and their clearance (e.g., in the case of nuts and bolts) will determine the required film thickness for optimum bonding.

The two metal surfaces and the interposed adhesive composition are maintained in engagement until the adhesive composition has cured sufficiently to bond the surfaces. Cure advancement may be promoted by post-baking the bonded parts after an initial cure time at room temperature. Additionally, incorporation of glass beads to control bond-line thickness is preferred especially in hemming operations, as is taught in U.S. Pat. Nos. 5,487,803 and 5,470,416.

Although the present invention has been described with reference to particular embodiments, it should be recognized that these embodiments are merely illustrative of the principles of the present invention. Those of ordinary skill in the art will appreciate that the compositions, apparatus and methods of the present invention may be constructed and implemented in other ways and embodiments. Accordingly, the description herein should not be read as limiting the present invention, as other embodiments also fall within the scope of the present invention as defined by the appended claims.

EXAMPLES

Example 1—Cure Rate

Cure rate for acrylic adhesives is measured through Test Method 15 (TM-15). In this test, approximately 20 grams of mixed adhesive preconditioned at 25° C. was monitored for the time (after mixing) required in order to reach a maximum temperature generated by the reaction exotherm. The maximum temperature reached is also recorded. This allows for a relatively simple comparison of the rate of reaction (initiation and propagation) between different adhesive formulations. Additional information can be gained through closer examination of the temperature change over time. In looking at the rate of temperature change through the curing process, particularly the amount of time spent with minimal temperature rise versus the rate of temperature rise through the cure peak, one can estimate the ratio of Open Time vs Time to Handling Strength (described in more detail below). In the ideal reaction scenario, there is no rise in temperature for a period of time as the inhibitors block the polymerization reaction propagation, and then an instantaneous rise to the maximum temperature as the adhesive cures very rapidly and delivers high bond strength, as shown below. This is commonly referred to as "snap" cure and can be seen in FIG. 1.

Initial experiments were performed in order to compare the effect of various amine accelerators on the TM-15 cure speed of the chosen model acrylic adhesive system. A masterbatch formulation was prepared without amines according to the recipe in Table 1.

TABLE 1

| Masterbatch | |
| --- | --- |
| Reagent | Amount |
| Acrylate Monomers | 60.2 g |
| Rubber Tougheners | 28 g |
| Inhibitors | 80 ppm |
| Wax | 1 g |
| Methacrylic acid | 1 g |
| HEMA-Phosphate | 3.5 g |
| Adhesion Promoter | 0.5 g |
| Fumed Silica | 4 g |

Reducing agents and co-accelerators were then added to form comparative samples that could be cured using Lord Accelerator 17 (Commercially available from LORD Corporation and employing a BPO based oxidizer), with the amounts shown in Table 2 below added to 98.2 grams of Masterbatch.

TABLE 2

| Reducing agent & co-accelerator | | | | | |
|---|---|---|---|---|---|
| Reagent | 1 | 2 | 3 | 4 | 2A |
| DIIPT | 1.80 g | 0.80 g | 0.80 g | 0.80 g | 1.50 g |
| DMA |  | 1.00 g |  |  | 2.50 g |
| DMP |  |  | 1.00 g |  |  |
| TDA |  |  |  | 1.00 g |  |

Sample 1 contains the reducing agent N,N-diisopropanol-p-toluidine (DIIPT) with no co-accelerator. Sample 2 contains DIIPT with anther reducing agent N,N-dimethyl-p-aniline (DMA). Sample 3 contains the reducing agent DIIPT with a common tertiary amine additive dimethylpiperazine (DMP). Sample 4 contains the reducing agent DIIPT with the inventive co-accelerator 1,4-diazabicyclo[2.2.2]octane (TDA). For samples 1 through 4, direct comparison was made of equal weights of amine compounds, i.e. reducing agent and accelerator combined. TM-15 plots are shown in FIG. 2.

Figure 2:
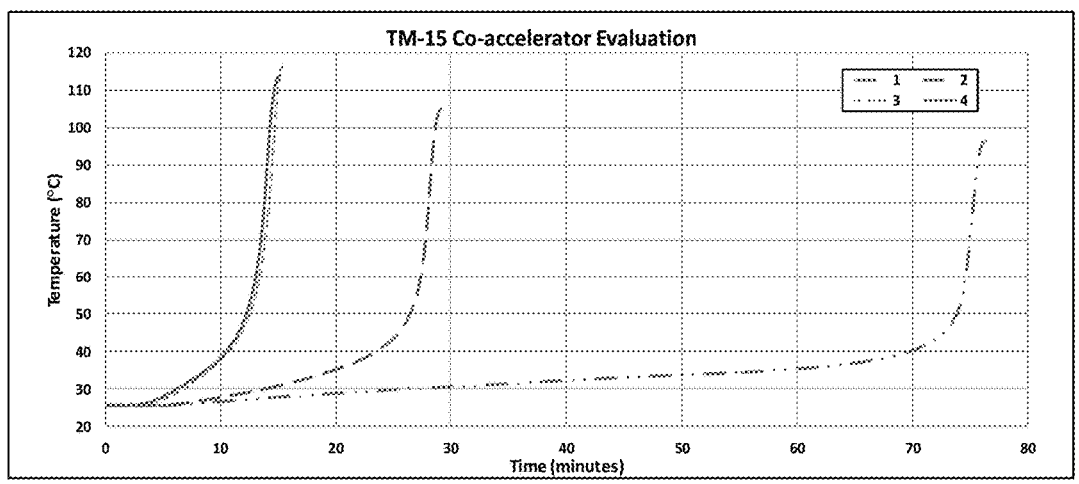
FIG. 2 illustrates the temperature profile of curing compositions of the prior art as compared to embodiments of the present invention.

Within this data set, and illustrated in FIG. 2 it can be seen that the TDA containing formulation delivers much higher cure speed at the same weight loading compared to either DIIPT alone or DIIPT plus DMA, and slightly better than the DMP containing formulation. Sample 2A was an attempt to adjust the amount of the DIIPT/DMA accelerator system to match the cure speed of DIIPT/TDA for further experiments, since it is important for a fair comparison to evaluate the properties of acrylic adhesives that have similar cure speeds. Note that it was not possible to adjust the cure speed of the formulation containing only DIIPT so that the cure speed would approach 15 minutes. The TM-15 plots of the rate-adjusted samples are shown in FIG. 3.

Figure 3:
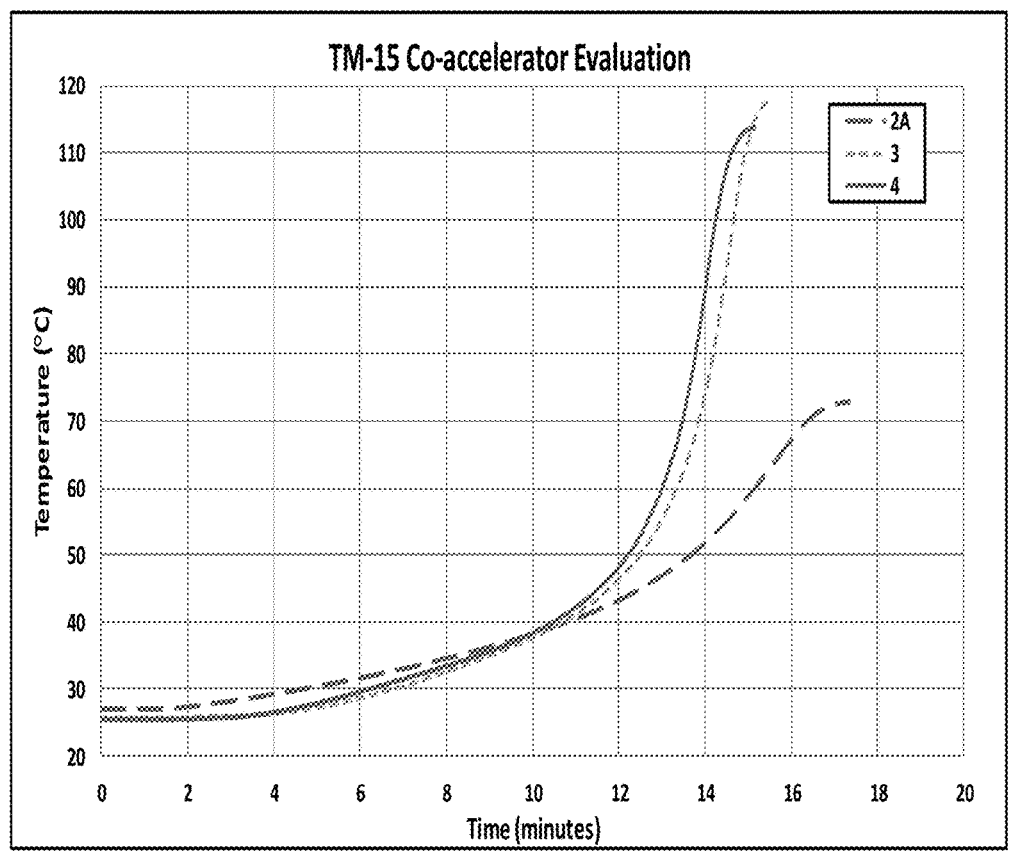
FIG. 3 illustrates the temperature profile of curing compositions of the prior art as compared to embodiments of the present invention.

It can be seen in this data set in FIG. 3 that even with a significant increase of DMA loading (above the molar equivalence to TDA) and concurrent increase in DIIPT loading to increase the cure speed, the rate of temperature rise does not have the same characteristics of "snap" cure as the TDA containing sample. The earlier rise in temperature and dramatically lower peak exotherm for sample 2A show that the reaction kinetics are significantly different. As mentioned above, the amine accelerator package must overcome the cure inhibition of both the added inhibitors and the acidic adhesion promoters. It is believed that the generation of stronger "snap" cure by TDA is due to the stronger basicity that forms a strong complex with the acids and eliminates this inhibition to the cure rate. This is also observed to a slightly lesser extent in the DMP containing formulation, however the monocyclic structure of DMP is believed to hinder the exceptional performance exhibited by TDA. It will be seen that these cure characteristics will be reflected in the Open Time and Time to Handling Strength discussed below.

Example 2—Open Time Vs. Time to Handling Strength

Open Time is defined as the time allowed after the adhesive bead has been applied and before the substrates are mated that will deliver essentially equivalent bond strength as if the substrates were mated upon initial application of the adhesive. 'Essentially equivalent' bond strength is commonly understood to be within about 10% of the bond strength achieved with immediate mating of the substrates. Time to Handling Strength is defined as the time required after the adhesive bead has been applied and mated for the bond strength to exceed 100 psi. For acrylic adhesives, a longer Open Time will typically result in a longer Time to Handling Strength. It is generally most desirable to have a Time to Handling Strength that is minimally longer than the Open Time, referred to as "snap" cure or sometimes "cure on command". Typically, acrylic adhesives exhibit final bond strength of between 2,000-3,000 psi.

Open Time is measured through a test called Delayed Mating Open Time (DMOT). In this test, adhesive is applied to a series of 1"×4" aluminum coupons as quickly as possible, then coupons are mated with a delay of successively longer intervals of time, with 0.5" overlap between the two coupons and a 10 mil bond line thickness. The adhesive is then allowed to cure completely (typically overnight), and the coupons are pulled apart in shear. The results of Lap Shear Strength (LSS) and Failure Mode (adhesive vs. cohesive) are compared for each coupon to one mated with effectively zero delay, and the end of the Open Time is then judged by a reduction in strength of >10% of the original and/or reduction in cohesive failure to <80% (>20% adhesive failure).

Time to Handling Strength is measured through a test called Rate of Bond Strength Development (ROBSD). In this test, adhesive is applied to a series of 1"×4" aluminum coupons which are then immediately mated to a second coupon with 0.5" overlap and a 10 mil bond line thickness. The coupons are then pulled apart in shear over successively longer intervals of time, evaluating the Lap Shear Strength over time as the adhesive cures and bond strength increases. The Time to Handling Strength is judged by the time that it takes for the bond strength to reach 100 psi.

Figure 4:
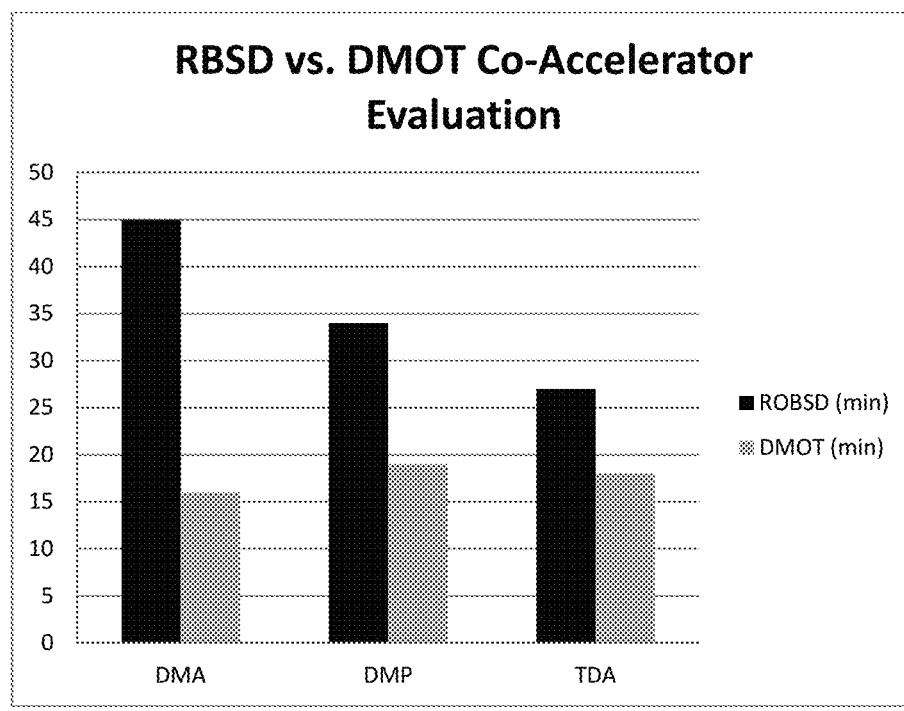
FIG. 4. Illustrates ROBDS and DMOT data of curing compositions of the prior art as compared to embodiments of the present invention.

Data for the ROBSD and DMOT testing are shown in the table below and in FIG. 4. As mentioned before, it is most relevant to compare acrylic adhesive systems that have roughly the same TM-15 cure rate. The ROBSD data in the table directly shows the faster reaction kinetics with the use of TDA as a co-accelerator. Note that the ROBSD time is significantly longer than the TM-15 time because the thin bond line and metal coupons greatly reduce the generation of heat during reaction. Thus these curing reactions occur at much closer to a constant (and lower) temperature than in the TM-15 test. The ratio of ROBSD to DMOT clearly shows a much more desirable "snap" cure with the use of TDA, especially compared to the sample containing DMA (exhibiting the lowest ROBSD/DMOT ratio), and highlights the improvement over the current reaction enhancer DMP.

| Sample | Amine(s) | TM-15 (min:sec) | ROBSD (min) | DMOT (min) | ROBSD/DMOT |
|---|---|---|---|---|---|
| 2A | DIIPT/DMA | 17:20 | 45 | 16 | 2.81 |
| 3 | DIIPT/DMP | 15:34 | 34 | 19 | 1.80 |
| 4 | DIIPT/TDA | 15:09 | 27 | 18 | 1.50 |

Example 3—Cure Rate Sensitivity to Acidic Compounds

Adhesion promoters for acrylic adhesives typically include acidic compounds which are known to facilitate bonding to metal. One preferred adhesion promoter is 2-hydroxyethylmethacrylate phosphate (HEMA-phosphate). However, HEMA-phosphate is known to slow the cure speed of DIIPT cured adhesives and as such there exists a trade-off between adhesion and cure rate. For example, in the commercially available Lord 410/19 using a combination of DIIPT and N,N-dimethylaniline as the reducing agent and BPO as the oxidizer, the addition of about five hundredths of one percent HEMA-Phosphate will slow the Time to Peak Exotherm of a 20 gram mass by one minute. Surprisingly, the combination of DIIPT with TDA causes the formulation to be insensitive to even large changes in HEMA-Phosphate loading allowing for the use of greater quantities of adhesion promoter without changing the cure rate. For example, in an experimental formulation containing DIIPT and TDA, the addition of 3% HEMA-Phosphate slowed the Time to Peak Exotherm of a 20 gram mass by only 12 seconds (essentially within error of the test).

What is claimed is:

1. A curable composition comprising a free-radical polymerizable acrylic monomer, an oxidizing agent, an aromatic tertiary amine reducing agent, and a tertiary amine co-accelerator comprising a bicyclic diaza compound that increases the reaction rate between the oxidizing agent and the reducing agent, wherein the curable composition is provided in two parts: in part A: (a) the at least one free radical-polymerizable acrylic monomer; and (b) the reducing agent and in part B: an oxidizing agent wherein the co-accelerator is present in at least one of part A or part B, and the weight ratio of part A to part B is from about 1:1 to about 15:1.

2. The composition of claim 1, wherein the reducing agent comprises at least one of N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; N,N-diethyl-p-bromoaniline; N,N-dimethyl-p-aniline; or N,N-diisopropanol-p-toluidine.

3. The composition of claim 2, wherein the aromatic tertiary amine reducing agent comprises N,N-diisopropanol-para-toluidine.

4. The composition of claim 1, wherein the co-accelerator comprises 1,4-diazabicyclo[2.2.2]octane.

5. The composition of claim 1, wherein the tertiary amine reducing agent comprises N—N-diisopropanol-para-toluidine and the co-accelerator comprises 1,4-diazabicyclo[2.2.2]octane and the composition is otherwise free of amine compounds.

6. The composition of claim 1, wherein the composition is free of isocyanate compounds.

7. The composition of claim 1, wherein the free radical-polymerizeable monomer comprises at least one of methylmethacrylate, or tetrahydrofurfuryl methacrylate.

8. The composition of claim 1, further comprising a toughener.

9. The composition of claim 8, wherein the toughener comprises at least one of glycidyl methacrylate/carboxyl terminated butadiene (GMA/CTB) adducts, core-shell impact modifiers, or block copolymer elastomers.

10. The composition of claim 1, further comprising an adhesion promoter.

11. The composition of claim 10, wherein the adhesion promoter comprises hydroxyethyl methacrylate phosphate.

12. The composition of claim 1, further comprising methacrylic acid.

13. The composition of claim 1, wherein the oxidizing agent comprises benzoyl peroxide.

14. The composition of claim 1 disposed between two substrates and cured so as to provide a bond therebetween having a bond strength of at least 1000 psi as measured by lap shear strength.

15. The composition of claim 14 wherein at least one of the two substrates comprises aluminum.

* * * * *